(12) United States Patent
Jeter (10) Patent No.: US 7,145,834 B1
(45) Date of Patent: Dec. 5, 2006

(54) WELL BORE COMMUNICATION PULSER

(76) Inventor: John D. Jeter, P.O. Box 846, St. Martinville, LA (US) 70582

(*) Notice: Subject to any disclaimer, the term of this patent is extended or adjusted under 35 U.S.C. 154(b) by 0 days.

(21) Appl. No.: 11/354,476

(22) Filed: Feb. 14, 2006

(51) Int. Cl.
*G01V 3/00* (2006.01)

(52) U.S. Cl. ............... 367/83; 340/854.4; 251/189.05; 175/38

(58) Field of Classification Search ............ 340/855.7, 340/854.4; 367/83; 251/129.04, 129.05; 175/38
See application file for complete search history.

(56) References Cited

U.S. PATENT DOCUMENTS

| | | | |
|---|---|---|---|
| 4,825,421 A | 4/1989 | Jeter | |
| 4,847,815 A * | 7/1989 | Malone | ............ 367/84 |
| 5,020,609 A | 6/1991 | Jeter | |
| 5,117,398 A | 5/1992 | Jeter | |
| 6,002,643 A * | 12/1999 | Tchakarov et al. | ............ 367/85 |
| 6,898,150 B1 * | 5/2005 | Hahn et al. | ............ 367/85 |
| 6,975,244 B1 * | 12/2005 | Hahn et al. | ............ 340/855.7 |

* cited by examiner

*Primary Examiner*—Albert K. Wong
(74) *Attorney, Agent, or Firm*—John D. Jeter

(57) ABSTRACT

The preferred pulser is a mud powered oscillator powered by the pressure variation produced across the signal valve by the unstable action. The signal valve comprises a poppet and cooperating orifice. The pressure drop across the orifice is used to urge the poppet away from the orifice and an opposing spring drives it toward the orifice. The preferred poppet control is a permanent magnet that secures the poppet in at least the signal valve open position. To generate a pulse, the permanent magnet is opposed by a magnetizing coil arranged and powered by the associated MWD instrument to oppose the permanent magnet, to release the poppet to close the signal valve. The pulser is arranged to provide a generally central axially extending bore to accept a conductor extending axially through the pulser. Optional features include an acceleration compensator, and a mud powered electric energy generator. Optional features include hydraulic actuation and control of the poppet. The poppet can be fitted with an automatic pulse pressure amplitude control. The poppet can use overtravel to produce the on-pulse dwell time required to build pulse signal energy rather than the use of energy to hold the signal valve closed. Various mounting options are provided.

16 Claims, 10 Drawing Sheets

WELL BORE COMMUNICATION PULSER

This invention pertains to a communication pulser to generate fluid pressure pulses in a fluid stream flowing down hole, in a well, through a pipe string bore. It relates to (but is not limited to) Measurement While Drilling (MWD) communication in wells.

BACKGROUND

Petroleum related well drilling is now usually attended with the necessity to determine the location of the drill bit relative to the surface location of the well site. In most cases economic considerations, or government regulations, make it necessary to control the course of the drill bit throughout the deeper portion of the drilling process. The need for information and control has fostered the development of well bore communications. Communication is usually a matter of conveying data sensed down hole to receivers at the surface well site.

Most communication from a down hole location in a well is carried out by encoded, time spaced, pressure pulses in a fluid stream moving down the bore of a pipe string. The pulses are usually generated near a drill head operating in a well. In addition to drilling related data, such as angle off vertical, the pulser can communicate information related to various other conditions measured in a well.

In general, current MWD measurements are communicated by code carried by standing pressure waves in fluid pumped down hole in a pipe string or by time spaced digital pulses. In known cases the pressure variations travel from the down hole location to the surface where they are detected in the drilling fluid, or mud, circuit in surface gear.

Currently, MWD equipment used down hole interferes with directional control apparatus that tends to occupy some length of the drill string that is more effective if located near the drill bit. That, generally, forces the location of MWD farther from the drill bit. Data then transferred from sensors located in the MWD systems read data too far from the accomplished directional results.

Standing pressure waves are generated by apparatus often called a mud siren. The mud siren is a form of rotary valve apparatus, usually used to vary the resistance to a fluid stream moving down a pipe string. Digital pressure pulses may be created by a signal valve through which most of the fluid stream passes. This is called a positive pressure signal. Digital pulses can also be generated by by-passing some fluid from the pipe string to the well bore to reduce the resistance to fluid flow in the bottom hole assembly. These are called negative pressure pulses. The usual positive digital pressure pulses are of short duration and usually have a repetition rate of four pulses per second, or less. The negative pressure pulse generator is usually much smaller than the positive pressure pulse generator and the repetition rate could logically be higher than that achieved by the positive pressure pulse generator.

MWD packages can be of several forms. They can be installed in a drill string serial element or run into the bore of a drill string after it is in the well. Also, there are "hybrids" of the two systems such that batteries alone, batteries with instruments, or other combinations can be run into the drill string bore to join up with the parts mounted, or installed, in the drill string serial element. The installed system offers the ease of providing mud flow generated electric power down hole, but it must be very reliable to avoid costly round trips of the drill string to replace failed MWD assemblies. The most used arrangement today appears to be the shuttle MWD package that utilizes an orifice installed in the drill string. That situation suggests enduring problems with MWD systems in general.

If MWD systems become quite reliable, they will likely evolve to the installed version. The earlier systems were installed. The shuttle system, is somewhat troublesome itself, but it made more serious problems manageable.

MWD systems exist in either the positive pulse or negative pulse versions, but no shuttle packages are known that deliver negative pulses achieved by the process of by-passing mud through the drill string wall.

Evolution of MWD activities have proceeded in steps largely dealing with solutions to stubborn problems. Early successful mud pressure signal pulsers had little MWD support and served primarily as drilling turbine speed indicators, or tachometers. Such pulsers were powered by the turbine being monitored. When MWD systems were developed, a pulser was available but a substitute for the drilling turbine was needed. Operation of flow resisting signal valves down hole requires power. Down hole fluid powered motors, substitutes for drilling turbines, have been used to generate power to operate the signal valves, which were moved by fluid powered cylinders. This process brought considerable apparatus into the process, all of which was prone to result in operational uncertainties. Operational uncertainties are not very acceptable in expensive and dangerous well drilling operations.

The need to reduce the apparatus involved in generating digital pulses resulted in the development of self powering valves. My U.S. Pat. No. 3,065,416, issued Nov. 20, 1962 ushered in that self-powered era. These valves were powered by the pressure generated by the valve itself. These early self-powered valves had poppets that moved against the mud stream toward an orifice through which most of the mud stream flowed. The mud stream passed through the signal valves with high velocity. The high velocity mud impinged upon the apparatus and resulted in serious erosion problems. The self-powered signal valve required only a small servo valve and the need for power to manage the pulser was a minor problem. No solution to the erosion problem is known before 1992.

The erosion problem was reduced by turning the self-powered valve upside down. The Jeter, et al, U.S. Pat. No. 5,103,430, issued Apr. 7, 1992 led the extended use of the upside-down, self-powered, signal valve. The high velocity mud leaving the signal valve expends its energy in the general mud flow channel down stream of the signal valve. Below the signal valve, there is little or no related apparatus. Currently, the upside-down valve appears to dominate the MWD operations world wide. The upside down valve benefits from the fact that the velocity of fluid entering the orifice can be converted to stagnation pressure in the bore of the poppet situated upstream of the orifice to realize a pressure that is representative of the stagnation pressure downstream of the orifice.

As expressed herein, an open ended poppet situated upstream of an orifice, in the velocity field of the orifice, is defined as a source, or pressure tap, downstream of the orifice. That is anticipated by and is within the scope of the claims.

All self-powered, upside-down, signal valves now known still use a servo valve, often called a pre-valve, to control mud flow to a piston providing thrust to move the self-powered valve relative to the cooperating orifice. A mud flow restrictor combination that enables the servo-valve to control the signal valve greatly limits it's repetition rate.

Further, efforts to bolster the repetition rate has resulted in utilization of the shortest practical stroke of the poppet. The short poppet stroke about prohibits the use of pulse amplitude controllers, which require more stroke of the poppet. There is a need to eliminate the servo valve.

There is serious need for some way to pass a communication conductor axially through the pulser. Elimination of the servo-valve may allow the bore of the poppet to be enlarged and to extend farther into the pulser. Enlargement of the bore of the poppet may enable the use of mud powered apparatus, such as electric power generators and hydraulic pumps, that need an open exhaust channel to the mud stream below the orifice.

There is a serious need for a conductor to pass through the pulser to allow sensors and controls to be placed near the drill bit. Currently, poppet control apparatus utilizes the generally central area of the pulser. If the poppet is made tubular, the ancillary features need also to be able to accept an axially extending tubular poppet.

A reliable MWD system, with a high probability of lasting a long bit run, and supplying the needed electric power, does not demand a shuttle system. It can be installed in the drill string as a serial element of the drill string to be changed out at the end of each bit run.

SUMMARY OF INVENTION

This invention relates to overall MWD systems which include instruments required to sense the conditions to be measured and to provide the controls needed to encode signals to be generated by the pulser. The instrumentation is essential but is otherwise not claimed. This invention enables the location and operation of electric power generation apparatus which may power the instrument and provide the energy needed to operate the signal valve, subject to instrument control.

The signal valve comprises an orifice through which the mud stream can flow and a cooperating poppet which has, in the preferred form, piston faces arranged such that the pressure drop created by the on-pulse signal provides the force required to open the signal valve. A spring urges the signal valve to close. Aside from the spring, the signal valve and it's control needs only one moving part. The signal valve control no longer moves any part. It only secures the poppet in selected positions. The troublesome current drain common to solenoids moving servo-valves in the pull-in phase no longer exists.

As expressed herein, an open ended poppet situated upstream of an orifice in the velocity field of the orifice is defined as a source, or pressure tap, downstream of the orifice. In the drawings, leftward is downward and downstream.

Such apparatus as mud motors, electric energy generators, hydraulic pumps, control valves, and pressure sensors are generally explained by the definition. Such apparatus is well within the understanding and production ability of those skilled in the related art. The confinement due to pipe string bore limits is usually a new design endeavor but the matter has been managed in the past.

The pressure sensed at the lower end of the poppet is conducted, through the poppet bore, to the upper end of the poppet. That flow path invites the use of a fluid powered electric energy generator because high pressure and low pressure mud sources are now available in adjacent high capacity mud flow circuits and there is adequate room for such features near the adjacent sources. An electric energy generator, preferably an alternator, is provided for optional use.

The material near the axis of rotation of both mud motors and electric energy generators serve little useful purpose and the poppet control rod (which may be tubular) can pass through a central bore in both without causing much loss of power.

When magnets secure any element relative to the housing the probable acceleration has to be considered. For example, a one pound element that can be secured, in a particular position, by a one pound holding force needs about an eleven pound restraint capability if a ten g acceleration occasionally hits the housing. In the vicinity of rock bits, that is a reasonable expectation. The preferred embodiment has provisions for an optional acceleration compensator that nullifies the need for poppet position restraint to allow for acceleration forces that hit the housing. That contrivance adds only one more part to the pulser assembly and may reduce the energy consumption by magnetic controls about eighty percent. My U.S. Pat. No. 5,020,609 issued Jun. 4, 1991 is directed to acceleration compensation apparatus. In effect, a seismic mass is suspended in the housing and tends to move relative to the housing being accelerated. That tendency to move creates a force that is applied to the member being secured by the magnet such that the member may be exposed to exactly the same acceleration as the housing. The securing magnet sees no change in load caused by acceleration. A poppet position control rod, part of the poppet, simply extends into the acceleration compensator and the end of the rod may function as a piston face. Down hole, a single piston face can be double acting because the hydrostatic head eliminates cavitation. On tubular poppets the compensator piston face may be annular.

The preferred pulser design, if not subject to restraint in either extreme travel limit, indicates that it can cycle, full stroke, at about six times the known cyclic rate for servo-valve controlled self-powered pulsers. The abundance of repetition rate and stroke length invites the use of signal valve mounted signal pressure amplitude controllers, and such controllers are provided for optional use. In effect, the controller has a piston that is opposed by a spring. The piston is subject to the pressure difference across the signal valve. When the signal valve moves toward closure, the piston shortens the poppet until, at full stroke, the desired signal pressure stands. When the poppet moves to open the signal valve, the controller can, optionally, extend the poppet until the desired off-pulse pressure drop exists across the signal valve. The off-pulse pressure differential, essential to power the servo-controlled pulser, is not needed for the present concept. It may be useful if an electric energy generator is used and requires a pressure differential in the off-pulse situation.

All known digital pulsers have a dwell time in the closed state. The dwell time is used to build signal energy so that at least part of the original pulse will reach the surface. Currently, holding the dwell takes electric energy. With or without the pressure differential controllers, the present pulser has an abundant overstroke ability. Because all known signal valves cannot fully close off the flow of fluid moving down the pipe string bore, the poppet is simply plunged into an oversize orifice. Once the poppet is into the orifice, it makes little pressure difference if it extends some additional distance. In most drilling situations, the overstroke can serve as dwell time. That eliminates the need for power to manage an on-pulse poppet. The on-pulse poppet restraint may be eliminated. Then only one brief electric pulse may be needed to initiate and complete a digital signal.

To prevent intense cycling, and almost certain damage, the present poppet is restrained in the off-pulse position. As an option, the off-pulse poppet restraint is a permanent magnet. To release the poppet from control by the permanent magnet, an electric coil is provided and oriented to oppose and temporarily disable the permanent magnet. The coil need be energized only long enough for the spring loaded poppet to escape the control of the magnet.

Summarizing now, a simple version of the present pulser requires one moving part. Adding an acceleration compensator adds another moving part. Adding the pulse pressure differential control adds another moving part. Using the available overstroke for dwell time may eliminate the need for an on-pulse dwell control and related power consumption. Using a permanent magnet for off-pulse poppet restraint allows the instrument to sleep until needed to initiate a pulse. A failed instrument would not leave the pulser in an on-pulse situation.

An optional axially extending communication conductor, passing through the poppet bore, adds no moving parts to the pulser. The conductor may convey torque for azimuthal information and control as well as electrical and hydraulic functions.

An alternate form of the pulser neutralizes the poppet in terms of reaction to pressure drop across the signal valve. That poppet will not propel itself. Only cylindrical surfaces are exposed to the high pressure mud side of the orifice. That condition dictates that power be supplied from some other source to move the poppet.

The absence of a servo-valve invites the use of the poppet as a large bore fluid channel usable for the discharge channel for a power generating mud motor within the MWD package. Use of an independent means to position the poppet enables the use of the signal valve as a change-of-state code generator. The expected change-of-state would involve two states, open and closed. Further, the poppet could be used in an amplitude modulation mode that may be particularly useful in shallow wells.

The pulsers presently disclosed are expected to serve mostly as positive pressure pulsers, but the negative pulser option exists. To serve as negative signal pressure pursers, any pulser disclosed can cooperate with a port that by-passes fluid to the well annulus to reduce the fluid flow resistance of the bottom hole assembly.

The negative pressure signal pulser controls, generally, only about ten percent as much fluid as the positive pulser. The signal valve can likely be operated with about ten percent as much energy. The version of the poppet that is not responsive to pressure difference across the signal valve, then, is easier to drive in the negative pulser configuration.

By-pass type negative pulsers are expected to operate with the signal valve normally closed. The by-pass versions of the pulser can be either of the installed or shuttle types, or combinations of the two types.

These and other objects, advantages, and features of this invention will be apparent to those skilled in the art from a consideration of this specification, including the attached claims and appended drawings.

DETAILED DESCRIPTION OF DRAWINGS

In the formal drawings, some features that are well established in the art and do not bear upon points of novelty are omitted in the interest of descriptive clarity. Such omitted features may include threaded junctures, weld lines, sealing elements, pins and brazed junctures. The omitted features are familiar to those skilled in the art of machine construction.

The MWD housings, if used, may be of separable components by which configuration part of the MWD system may be recovered by wire line, leaving some of the MWD system in the drill string. The flow indicating arrows point down hole.

As shown, the MWD assemblies are part of a system positioned in a pipe string, usually near the lower end. If the MWD package is to be run into the pipe string bore as a shuttle package, the pipe string is normally fitted with a receiving arrangement (not shown) known as a mule shoe. Alternatively, the MWD package may be suspended, and firmly affixed, in the bore of the pipe string and positioned to allow a poppet in the MWD package to cooperate with an orifice that is part of the pipe string. Further, the MWD assembly components may be situated in features machined into the pipe string serial element. All such mounting options are anticipated by and are within the scope of the claims. As shown, the mounting within the pipe string is symbolic. The housing that contains the poppet operating assembly normally contains the principal MWD instrumentation that does the sensing of conditions in the well, does the encoding, and produces the signals to control the positions of the poppet. Batteries are normally in the package above the pulser assembly. The signal valve orifice also may be situated in the MWD package. The instruments are accepted as essential to the activity but are not, otherwise, part of this disclosure.

Figure 1:
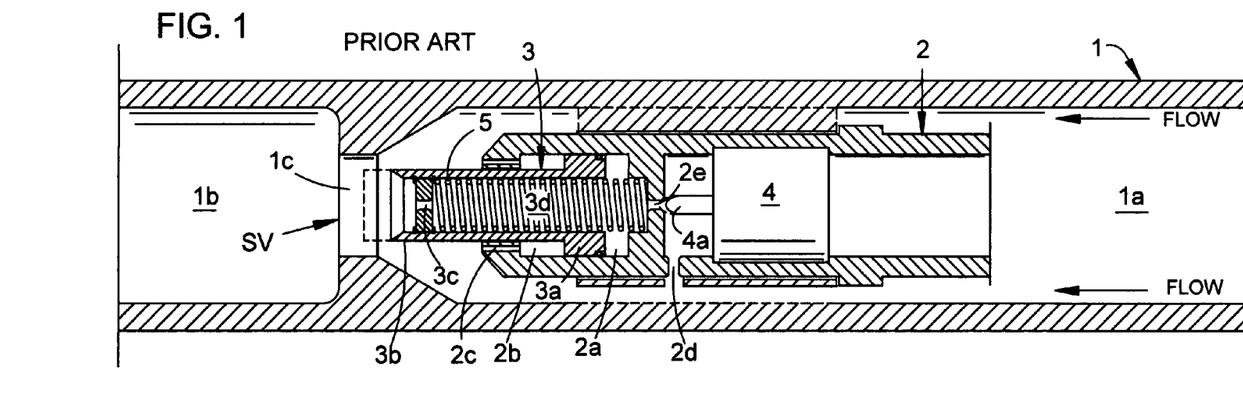
FIG. 1 is a side view, mostly in cut-away, of the lower end of a prior art MWD assembly in position in a pipe string.

FIG. 1 is a prior art assembly showing only the signal valve actuating apparatus of a MWD package. In pipe string 1, MWD housing 2 is suspended in bore 1a and positioned such that poppet extension 3b can cooperate with orifice 1c to act as a pressure pulse signal valve SV. Piston 3a moves in a bore with chambers 2a and 2b, and moves poppet end 3b relative to the orifice. Spring 5 urges the poppet toward the orifice, and pressure admitted through ports 2c to chamber 2b urges the piston away from the orifice. The strength of spring 5 determines the pressure difference across the signal valve SV when no pulse is being created. That operating pressure is needed to urge fluid to flow through port 2d, through orifice 2e and orifice 3c. A pulse is created when servo poppet 4a opens orifice 2e, to raise the pressure in chamber 2a. Servo-valve operator 4 is responsive to the instrument controlling the MWD package. Operator 4 is usually a solenoid or stepping motor. Batteries are used to power the MWD package and there is a tendency to design the orifice 2e rather small to save operating power. Reducing the size of orifice 2e reduces the repetition rate of pulse generation. To maximize the repetition rate, the poppet stroke is minimized. The short poppet stroke will not allow the use of known, simple, signal pressure amplitude regulators. The bore 3d would invite the use of mud driven electric generators if the orifices 2e and 3c could be eliminated.

Figure 2:
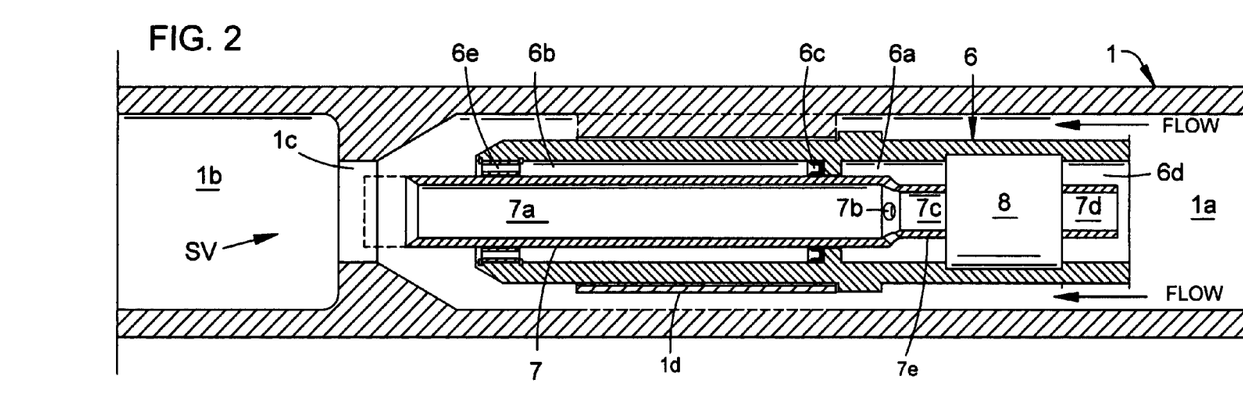
FIG. 2 is a side view, mostly cut away, of one form of the present invention.

In FIG. 2, pipe string 1, with bore 1a, has an orifice 1c situated to cooperate with poppet 7 to form a signal valve SV. Bore 1b is downstream of the orifice 1c. Feature 1d is a symbolic support for the MWD package, which may include a muleshoe. It will function as intended in many forms of support. All poppet controlling features are, preferably, situated in housing 6. The poppet 7 has bore 7a, open at the lower end, to receive fluid pressure equivalent to that below the orifice 1c. Openings 7b transmit the pressure in bore 7a to all areas 6a,6d. and 1a above the seal 6c. Poppet guide 6e supports the poppet radially and admits fluid through vents, into zone 6b, and lubricates the poppet movement. Poppet control rod 7e extends into the poppet position control contrivance 8. The poppet position control contrivance 8 may be a solenoid, stepping motor, hydraulic cylinder, or other linear motor. If bores 7c and 7d are not needed, that tubular part of poppet 7 can be in another form such as a rod.

All piston surfaces of the poppet 7 are subjected only to the pressure standing in bore 7a. The poppet requires only small moving force to move to or from the closed position. The higher fluid pressure (above the orifice) in area 6b acts on only cylindrical surfaces and has no influence on the axial movement of the poppet. This form is rather suitable for use with the negative pressure pulse arrangement shown in FIG. 4. The large flow bores 7a–7d invite the use of mud driven alternators to provide electric power for the MWD package.

Figure 3:
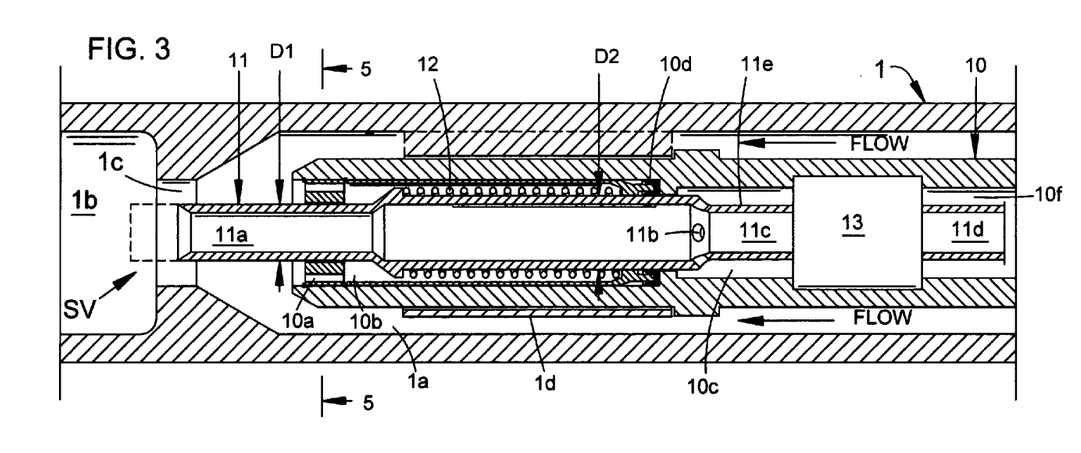
FIG. 3 is a side view, mostly in cut-away, of the preferred form of the invention.
Figure 6:
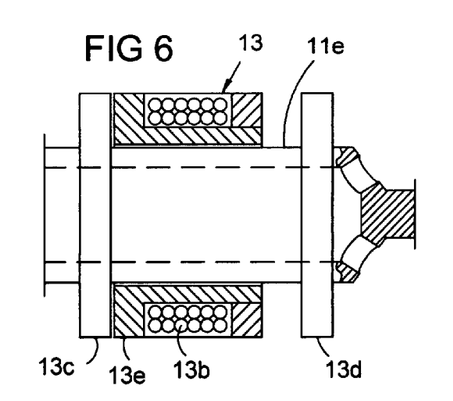
FIG. 6 is a side view, somewhat enlarged and partly cut away, of the poppet position controller preferred for the pulser of FIG. 3.

FIG. 3 shows the preferred pulser format. This is a self energizing, directly controlled, signal generator. D1 and D2 are diameters and define an annular sectional area that represents opposed piston areas separated by seal 10d. Fluid pressure from upstream of the orifice 1c is admitted by ports 10a to chamber 10b. One piston face is exposed to fluid pressure above the orifice and the other face is exposed to pressure below the orifice, by way of bores 11a and ports 1b to bore 10c. All other piston areas are exposed to fluid pressure from below the orifice, conducted to the general enclosure of the housing by way of bore 10f. The pressure difference across the signal valve urges the signal valve to open. The spring 12 urges the signal valve closed. In theory, the poppet could move away from the orifice until the spring force and the piston force is balanced with no pulsing taking place. The poppet and all mass moving in sympathy has weight and any movement overrides the balanced state. This is the equivalent of a mechanical tank circuit. There is a constant poppet movement toward correction of balance condition error. Only a few early short strokes occur before the poppet either oscillates freely between travel limits or is restrained at least at one limit of travel by the poppet position controller 13. The preferred controller is shown by FIG. 6, but any form of effective control can be applied. Associated hardware, to make the pulser of FIG. 3 part of an overall MWD system is disclosed later herein and no wiring or other control actuating means is shown.

Structurally, pipe string 1 with bores 1a and 1b separated by the orifice 1c carries the housing 10 positioned, and oriented as necessary, by support 1d so that poppet 11 can cooperate with the orifice to provide the function of a signal valve SV. If free flow of low pressure mud through the bores 11c and 1d is not needed, a poppet control rod can replace the tubular upper end of the poppet.

Figure 4:
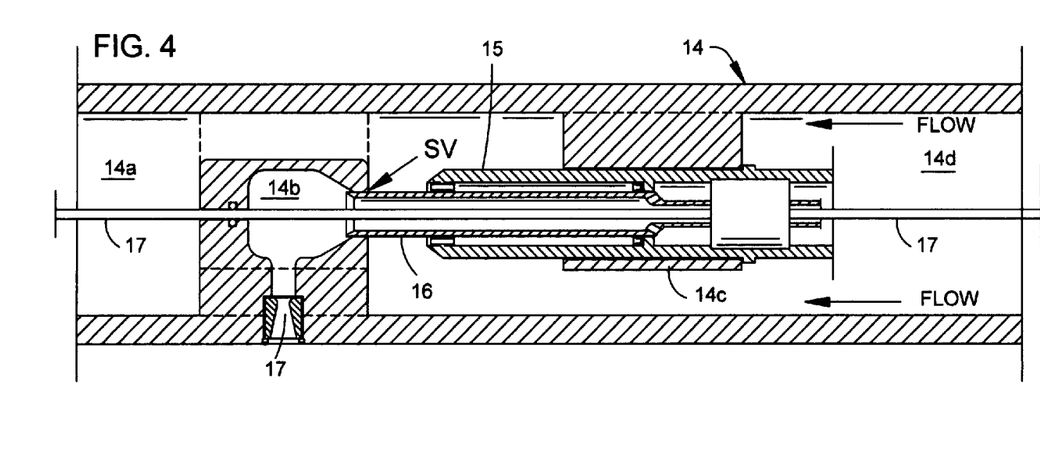
FIG. 4 is a side view, mostly cut away, of the pulser of FIG. 2 in a negative pulse configuration.

FIG. 4 shows the arrangement of the receiving features of the drill string that enables the use of pulsers capable of performing as positive pressure pulse generators to achieve the effects of by-pass types negative pressure pulse generators.

If the MWD package 15 is used as a shuttle, the support 14c will likely be a muleshoe. The MWD package may be an installed version. Conductor 17 is an optional feature.

Drill string 14 with bore 14d carries pulser 15 which controls fluid flow into chamber 14b which discharges fluid, when the signal valve SV is open, into the zone outside the drill string through aperture 17. The remaining fluid flow moves along bore 14a through the bottom hole assembly. The reduced flow through the bottom hole assembly produces less pressure drop in fluid moving down the drill string bore. The reduced pressure drop shows up in surface gear as a negative pressure pulse. Such signals are interpreted, to recover data, by currently available surface gear.

Figure 5:
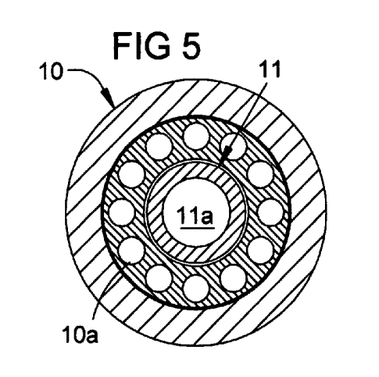
FIG. 5 is a section taken along line 5—5 of FIG. 3.

FIG. 5 is a section taken along line 5—5 of FIG. 3. The ports 10a can be seen to offer abundant flow area to enhance the cyclic speed of the signal valve. Flow areas of bore 11a and 10a influence the cyclic rate. There is no conventional servo-valve, and no related orifices to limit the cyclic rate.

FIG. 6 represents a preferred poppet position controller. This is the preferred form of controller 13 of FIG. 3 and controller 45 of FIG. 14. By preference, element 13e is a permanent magnet. This version of a controller is for restraint of positions to which the poppet is moved by other forces. It is a holding device. Unit 11e can be any length and could be a rod rather than a tube. The coil 13b is wound and powered, by the instrument in creating a pulse, to counter and nullify the permanent magnet 13e so that plate 13c can escape the control of magnet. The element 11e is attached to the poppet which is normally spring biased to move leftward in the drawing. The coil 13b can be energized for some time to hold the plate 13d, to secure the element 11e, and the poppet, in the signal valve closed position. For feature 45 of FIG. 14 the controller of FIG. 6 controls a rod, not a tube.

Figure 7:
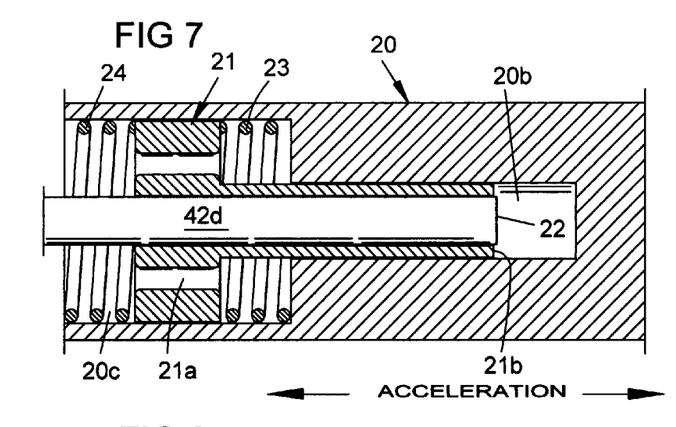
FIG. 7 is a side view, mostly cut away and somewhat enlarged, of an optional acceleration compensator for use any pulser disclosed herein.
Figure 8:
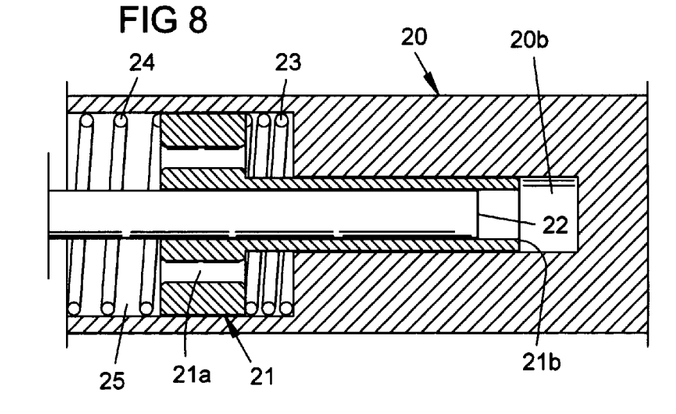
FIG. 8 is identical to FIG. 7, with components in alternate operational positions.

FIGS. 7 and 8 represent an acceleration compensator. It cannot reduce the acceleration but it can cause elements secured to structure subject to acceleration force to move in unison with the structure so that features holding the elements relative position will not experience any acceleration induced stress.

Structurally, housing 20 has bores 20b and 20c. Seismic mass 21, with a tubular extension with piston face 21b, is generally centralized by springs 23 and 24 for axial movement. Rod 42d, with piston face 22 is attached to a poppet. If the mass 21 is the same as the mass of rod 42d and all attached elements, the areas of pistons 21b and 22 will be about equal. If housing 20 is hit by leftwardly directed acceleration, for instance, the mass 21 will tend to stay still and produce a hydraulic pressure in chamber 20b. That hydraulic pressure will act against piston face 22 and the attached elements (poppet) will be accelerated leftwardly with the same effect as the housing 20. Any securing means keeping rod 42d in position relative to the housing will see no strain caused by the acceleration of the housing.

Piston faces 21b and 22 can act in both axial directions because the hydrostatic pressure down hole makes cavitation very unlikely. One piston face can be double-acting.

Figure 9:
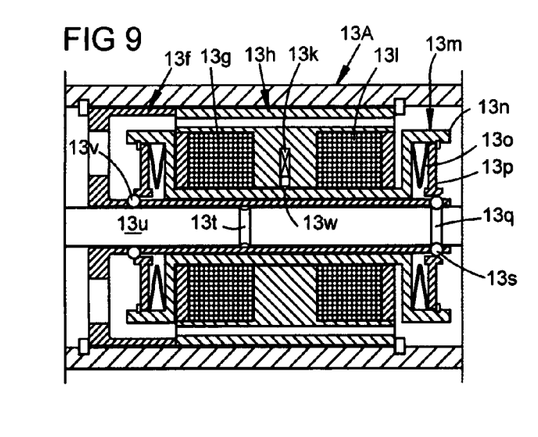
FIG. 9 is a side view, mostly cut away and somewhat enlarged, of the poppet position controller of FIG. 3.

FIG. 9 represents an alternate form of poppet position controller. Body 13A positions solenoid pack 13h and latch module 13f in an axial position relative to an MWD general enclosure. Rod 13u is an extension of a poppet such as 42 of FIG. 13. Rod 13u has grooves 13q and 13t that can be engaged by balls 13v and 13s to secure the rod in two alternate positions. Coils 13g and 13l can be energized by the MWD instrument to shift the armature 13m from one axial position to the other. The right end of the armature 13m is in the lock position. When moving to that position, security ring 13p could wait for the ball 13s to fall into groove 13q because spring 13o urges but does not compel the security ring to move. The last coil fired was 13g, and spring loaded detent 13k, engaging groove 13w retained the position shown. Functionally, a brief electric pulse delivered to a coil can prepare the controller to secure rod 13u is a selected position if and when it arrives in that position.

If the controller 13A is used, there is no need for the acceleration compensator of FIG. 7 and such apparatus can be used instead to prevent shock from dislodging the armature from the detent 13k. If the spring is stiffened in the detent to resist premature release of the armature, it requires a greater current in the coils to move the armature. The rod 42d of FIG. 7 can be attached to the hub 13n to protect the armature from the effects of shock.

Figure 10:
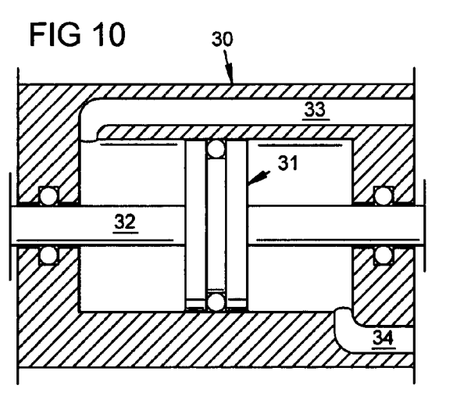
FIG. 10 is a side view, mostly cut away and somewhat enlarged, of an alternate form of the controller of FIG. 9.

FIG. 10 shows a poppet position controller that can be applied in two forms. For piston 31 to cause, or allow, rod 32 to move fluid has to flow in channels 33 and 34. To simply allow the rod 32 to move, flow between channels 33 and 34 can be controlled by a valve (see 59, FIG. 16) under control of the MWD instrument. For such pulsers as that of FIG. 2 the controller 8 is required to move the balanced poppet 7. For that application, fluid power would be made available by components disclosed herein (see 54, FIG. 16) and applied as needed to channels 33 and 34, under control of the MWD instrument. Such plumbing and controls are well known to those skilled in the related art.

Figure 11:
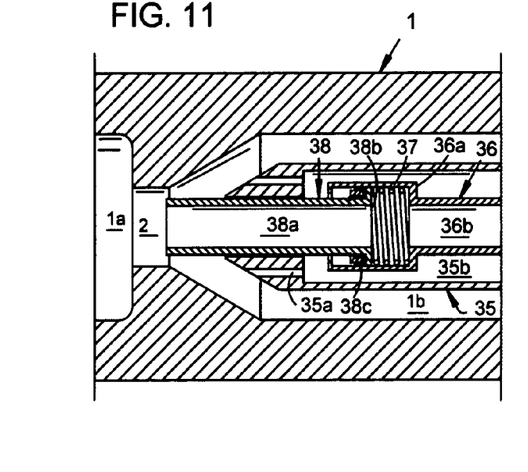
FIG. 11 is a side view, in cut-away of a pulse signal pressure regulator.
Figure 12:
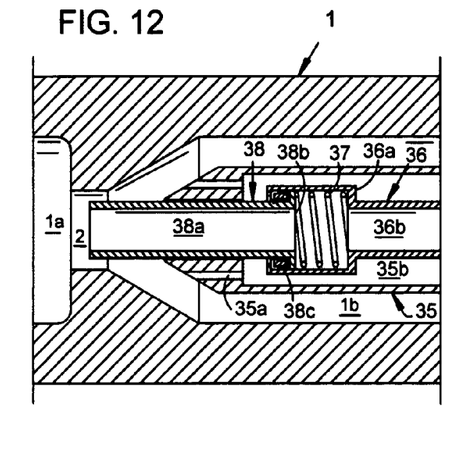
FIG. 12 is identical to FIG. 11, with elements in alternate operational positions.

FIGS. 11 and 12 represent a signal pressure pulse amplitude regulator. It can control either the maximum or minimum pulse amplitude, or both. MWD housing 35 is suspended in bore 1b of drill string 1, near orifice 2. Poppet 36, which may replace any of the poppets disclosed herein, has enlargement 36a to house spring 37 acting against piston face 38b of poppet extension 38. Low pressure mud from bore 1a stands in bores 38a and 36b and acts against a face of the piston 38b. High pressure mud enters ports 35a into chamber 35b and acts against seal 38c which constitutes an annular piston area. Spring 37 compresses in response to pulse amplitude until a balance, at the target pressure, is achieved. If spring 37 has enough travel it can control both on-pulse and off-pulse pressure amplitude at the ends of the poppet travel. Assuming a constant pressure being regulated, FIG. 11 is a high flow situation and FIG. 12 is a low flow situation.

Figure 13:
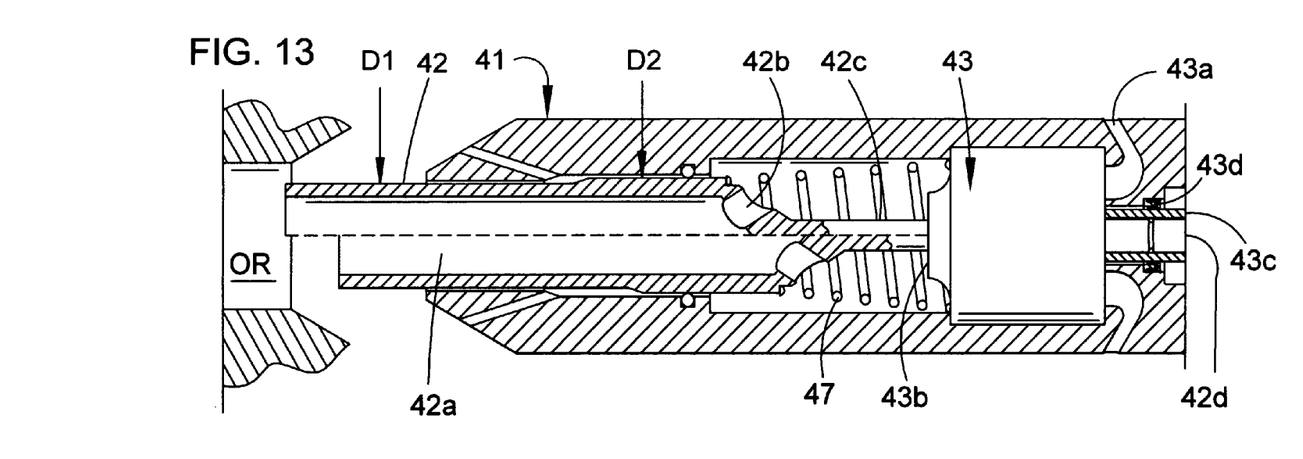
FIGS. 13 and 14 are mutually continuous side views, mostly cut away, of an alternate assembly of pulser elements.
Figure 14:
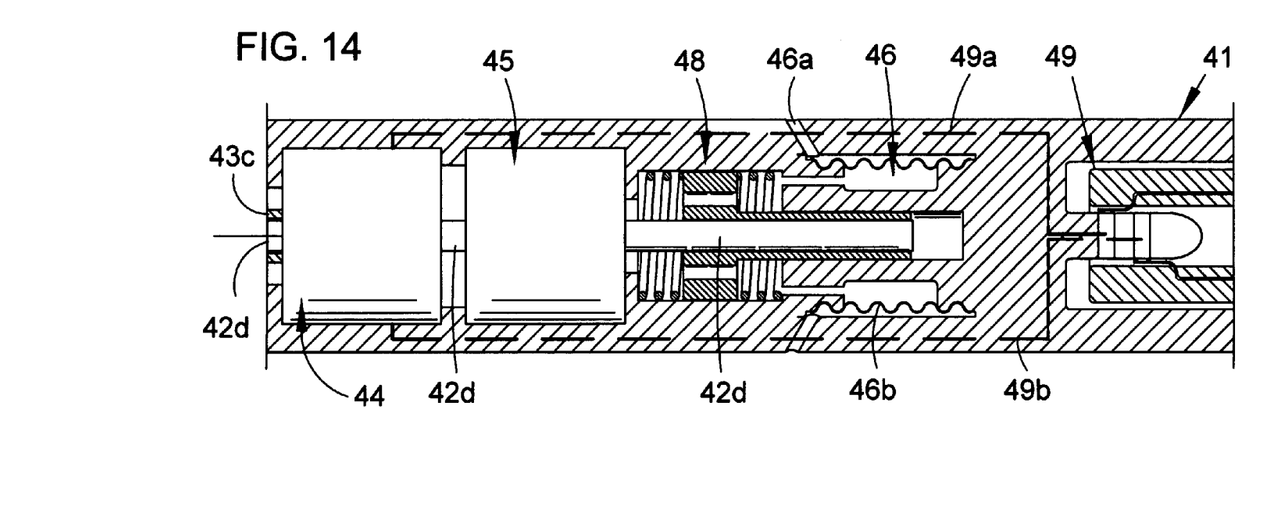

FIGS. 13 and 14 are mutually continuous and both include housing 41. The drill string has been omitted, except for the fragmented part OR of the orifice. This assembly is based upon the self powered poppet of FIG. 3 adapted to be controlled by a poppet position control rod that passes through the general center of a mud motor 43, an electric generator 44, a poppet position controller 45, and into an acceleration compensator 48. The mud motor drives the electric generator. The electric generator can connect with the instrument which may be housed with the pulser, threadedly attached, or slip attached to utilize the symbolic connector 49. Slip attachment means that at least part of the MWD instrument, or the battery pack, can be removed from the drill string bore independently of at least part of the overall MWD package while it is down hole.

The annular equivalent of a piston resulting in the difference between D1 and D2, on poppet 42, can propel the poppet to the right when pressure outside the poppet exceeds the pressure in bore 42a. Spring 47 urges the poppet toward the orifice and, if required, determines the pressure drop across the signal valve required to activate the related electric system. The poppet would oscillate unless controlled by rod 42c. The openness of the flow area including bore 42a and ports 42b invites the use of mud powered motors such as 43. The mud motor 43 drives the tubular shaft 43c which extends to generator (or alternator) 44. The control rod 42c extends into the poppet position controller 45 and on into the acceleration compensator 48. Seals 43d separate the mud filled zones from oil filled zones in the housing.

Bellows 46b separates oil and mud in the general enclosure of the housing.

The acceleration compensator has been described in relation to FIGS. 7 and 8.

The hydrostatic compensator 46 has an oil side vented to the general enclosure of the housing, and a mud side vented by port 46a to the mud channels outside the housing.

The poppet position controller action can be served by the apparati of FIG. 6, 9, 10, or 18.

The electric wiring is not described in detail. The heavy dashed lines 49a and 49b are symbolic and relate to the generator 44. A somewhat similar arrangement serves the controller 45. The swivel connector 49 allows the upper end of the MWD package to be attached by threads in the housing parts or by slip fit of a separately installed battery or instrument provision. The swivel connectors are in current use and are available for a wide variety of individual conductors. The wiring required is well established in the art.

Figure 15:
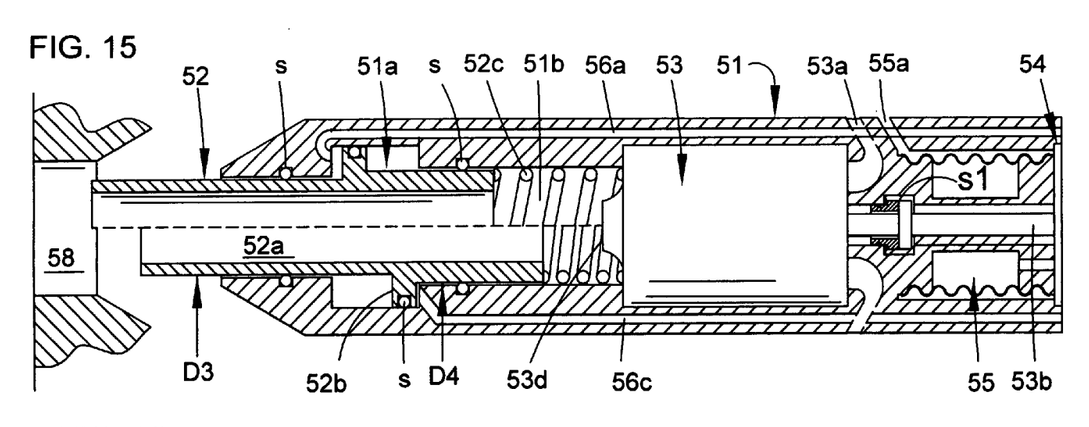
FIGS. 15 and 16 are mutually continuous side views, mostly cut away, of an alternate assembly of pulser elements.
Figure 16:
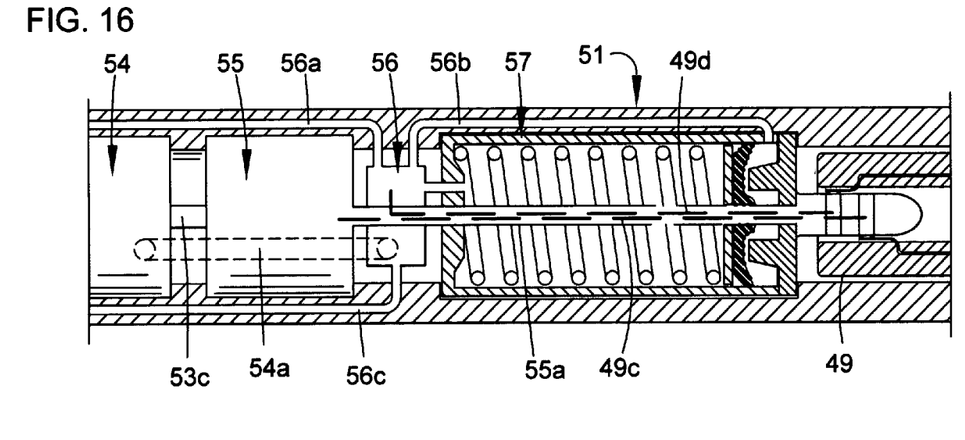

FIGS. 15 and 16 are mutually continuous, FIG. 15 being the bottom end, and the combination being the lower end of an MWD package. The housing 51 shown contains an electric energy generator and a selector valve connected to the instrument by wiring symbolically represented by conductors 49c and 49d which lead to the swivel connector 49 which, in turn, conducts current to and from the instrument.

The poppet position controller comprises power cylinder 51a, including piston 52b which is directly connected to the poppet 52. The power cylinder is controlled by operating fluid handling valve 56, which is controlled by the instrument. Pump 54 provides fluid power through duct 54a.

The fluid pressure inside the general enclosure of the housing is established by the hydrostatic compensator 55, which is the same as the mud pressure available through port 55a. That is the mud pressure well upstream of the orifice 58. Spring 52c and chamber 51b urges the poppet toward the orifice to produce an initial low pressure that is established in bore 52a. The pressure difference between port 53a and 53d allows the mud motor 53 to start delivering energy to shaft 53b and 53c to drive the electric energy generator 55. The MWD package can be sent down hole without batteries, or dead headed, and can be brought to life once drilling fluid flows.

Diameters D3 and D4 define effective, opposed, piston faces. One face is exposed to the pressure in bore 52a, the other face is exposed to higher pressure standing at port 55a. That is the pressure difference across the orifice 58, and thrusts the poppet away from the orifice and inposes an axial force on the piston 52b.

This version of the pulser is hydraulically controlled and fluid pump 54, driven by the shaft 53b, delivers oil to the control valve 56 and the accumulator 57. Fluid pressure in channels 56a and 56c reflect the pressure drop across the orifice 58 and, under control of the instrument, the valve can cause movement of the poppet to regulate the signal pressure pulse amplitude, pulse dwell time, and the rate of pressure change caused by the signal valve.

The valve may have pressure measuring ability, enabling it to convey pulse or background information to the instrument. Further, the valve controls the position of piston 52b and, hence, the poppet. The instrument, then can control the mode of pressure pulse code formulation.

This version of the pulser can engage in signal encoding of the digital pulse, change of state, or pulse amplitude modulation variety. Further, this pulser version can mix positive and negative pulses. Negative pulses can comprise negative changes in a standing background pressure.

This pulser can perform the negative signal pressure pulse function in the manner shown by FIG. 4. The signal valve, for negative pursers, is usually normally closed. The pulser of FIGS. 15 and 16 will go to the signal valve closed state, and drilling fluid flow will power up the instrument so that planned control can proceed.

Figure 17:
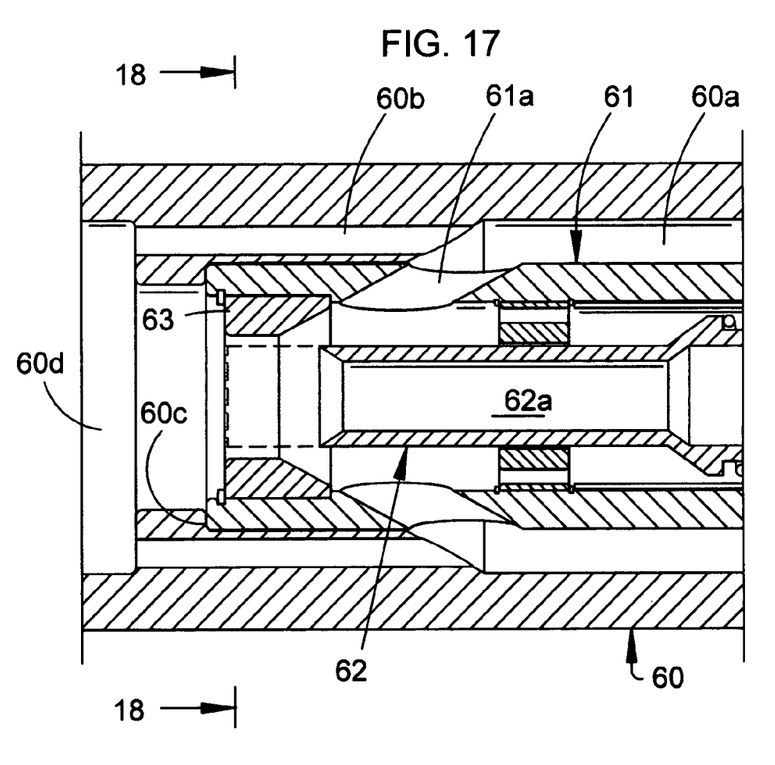
FIG. 17 is a fragmented side view, in cut-away, of the signal valve area of an alternate form of the pulser.

FIG. 17 shows the signal valve region of a pulser assembly having the orifice recoverable with the MWD package. Drill string element 60 carries MWD housing 61 in bore 60a. The housing is situated in receiving socket 60c. Fluid passing down bore 60a passes through ports 61a, through orifice 63 and into the continuing bore 60d. Poppet 62 cooperates with orifice 63 to perform as a signal valve. Optional by-pass ports 60b can conduct fluid from bore 60a to bore 60d.

Figure 18:
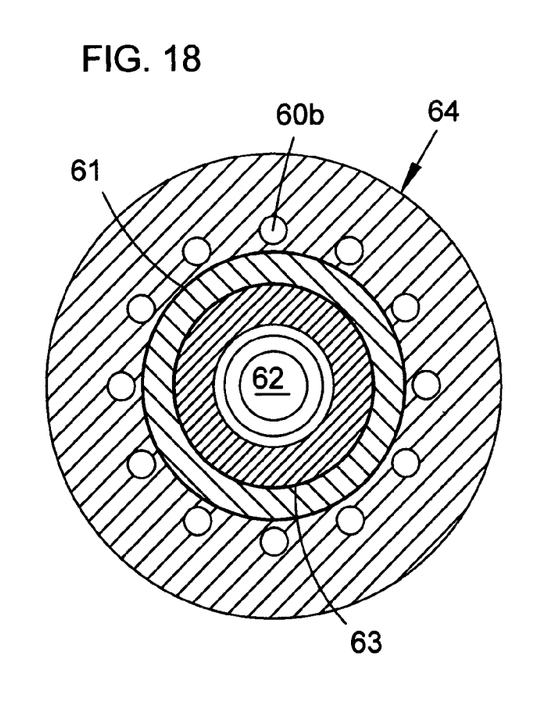
FIG. 18 is a sectional view taken along line 18—18.

FIG. 18 is a section taken along line 18—18. Flow bores 60b can be individually plugged to fine tune the by-pass fluid ratio if desired.

Figure 19:
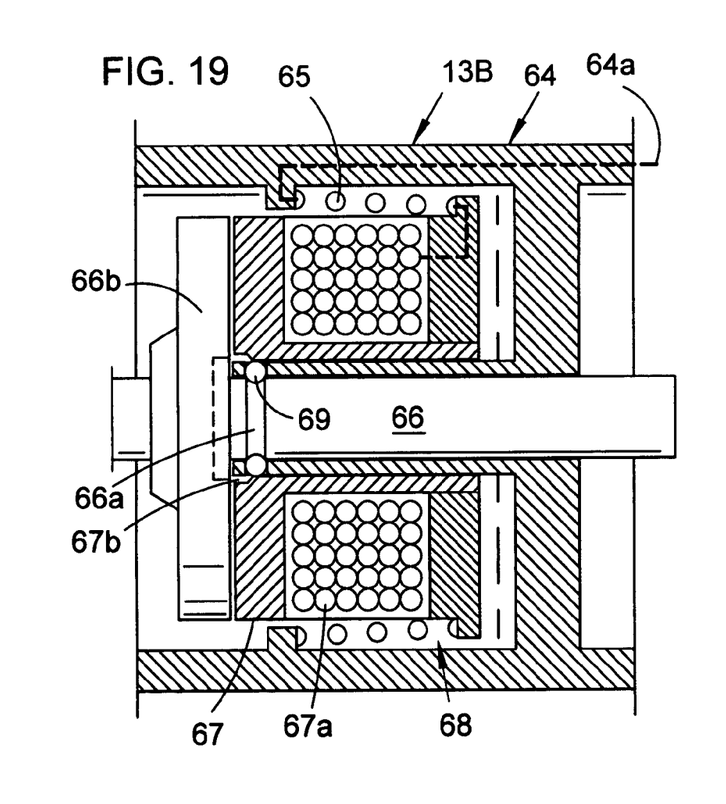
FIG. 19 is a fragmented side view, mostly cut away, of a poppet restraint apparatus.

FIG. 19 shows a poppet position controller 13B that locks the poppet position control rod in only one position. To secure the poppet in another position, a second similar device can receive the rod 66 and operate in a reversed orientation. Plate 67 is, preferably a permanent magnet.

Before plate 66b approaches the magnet 67, the magnet and coil assembly 68 will be pushed to the right by spring 65 and balls 69 will be riding the periphery of rod 66. Rod 66 is a poppet control rod and will move to the right as the poppet opens. When plate 66b nears the magnet 67, the magnet will acquire plate 66b. When the plate 66b starts to move leftward as the poppet begins to cycle, the magnet will follow and the balls 69 will be urged into groove 66a, and the rod will be locked. The rod no longer needs magnetic force to hold plate 66b from axial movement. The magnet does need the pull of the plate to keep the balls in place. The lock system can hold even if the instrument fails, or sleeps.

When the instrument elects to release the poppet for encoding action, electric energy is directed to the coil 67a by way of the conducting spring 65. The coil is wound and energized to oppose the magnet and null its hold on plate 66b. With the attraction to the plate 66b gone, spring 65 moves the coil assembly to the right, releasing the balls into recess 67b, freeing rod 66.

Figure 20:
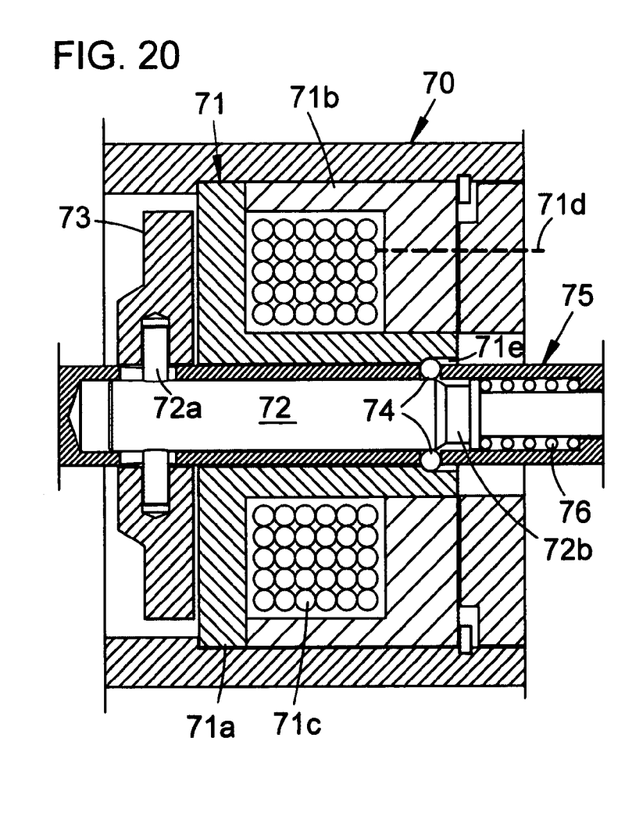
FIG. 20, is similar to FIG. 19, but latching by an alternate process.

FIG. 20 shows an alternate lock that does the same as that of FIG. 19 by different processes. The magnet assembly 71 is secured to the housing 70. Capture plate 73 can move on the poppet control rod 75. Plate 73 is attached to arbor 72 for movement relative to the rod 75. Rod 75 is normally biased leftward, toward the orifice, in the usual pulser assembly. When plate 73 is released from the magnet 71 by an electric input from the instrument to coil 71c, spring 76 moves the arbor 72 leftward and balls 74 fall into recess 72b to release the rod 75. The enclosure element 71b and conductor 71d are symbolic. Exact structure of the magnet is usually left to the supplier and can be configured in various preferences.

Figure 21:
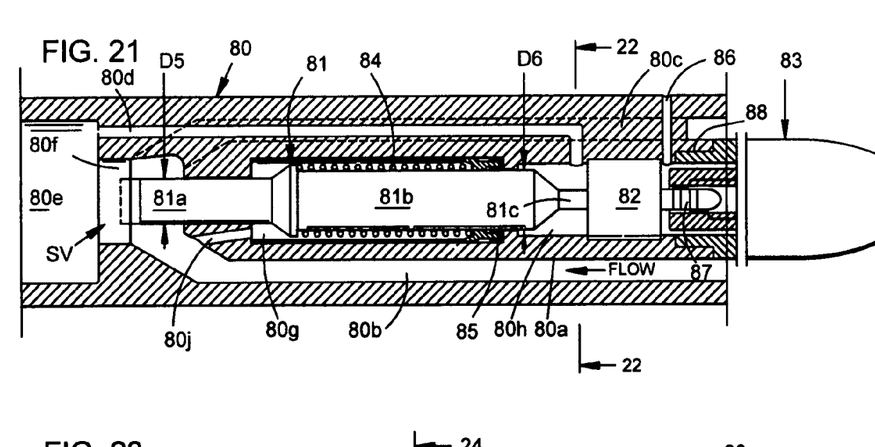
FIG. 21 is a side view, mostly cut away of an installed version of the pulser.

FIG. 21 shows an installed version of the pulser part of the MWD system. The serial element of a drill string 80 is shaped to accept the poppet 81 such that it can cooperate with orifice 80f to produce the effect of a signal valve SV. This is essentially the pulser of FIG. 3 in terms of performance, but there is no readily detachable housing. The upper portion 83, usually contains the instrument and batteries and may be detachable while the pulser is down hole and slip fit connection 88 may be used. Optionally, connection 88 may be threaded. The swivel connector 87 may be electric or hydraulic to serve the poppet position controller in package 82. Optional port 86 allows low mud pressure to be tapped from the well bore annulus. Fluid pressure available at port 86 is still lower than fluid pressure in bore 80e and does not depend upon off-pulse pressure to drive such as electric energy generators.

Port 86 can replace the channel 80d but will be subject to greater pressure difference relative to the pressure in chamber 80g but the difference will change only in response to the change in pressure drop across the signal valve. Port 86 qualifies as being down stream of the signal valve.

The fluid channel 80d from downstream of the orifice to the zone 80h serves the same purpose as the hollow poppet of FIG. 3. Poppet end 81a and orifice 80f serves as signal valve SV. Port 80j conducts fluid from channel 80b to chamber 80g. The section area differences produced by the difference between diameters D5 and D6, in conjunction with seal 85 causes the poppet to respond to the pressure difference across the signal valve to rise against spring 84 for the self powered action of the poppet. Poppet areas 81b and 81c may be tubular The configuration 80a, that may be intrinsic with the pipe string serial element 80, is made more practical by the availability of electron beam welding and the entire serial element may be an expendable unit.

Figure 22:
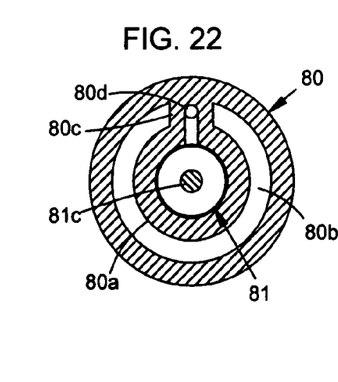
FIG. 22 is a section taken along line 22—22.

FIG. 22 is a section showing the housing equivalent 80*a* attached to the serial element 80 by web 80*c*, having channel 80*d* imbedded. The flow channel 80*b* conducts the major mud stream.

Figure 23:
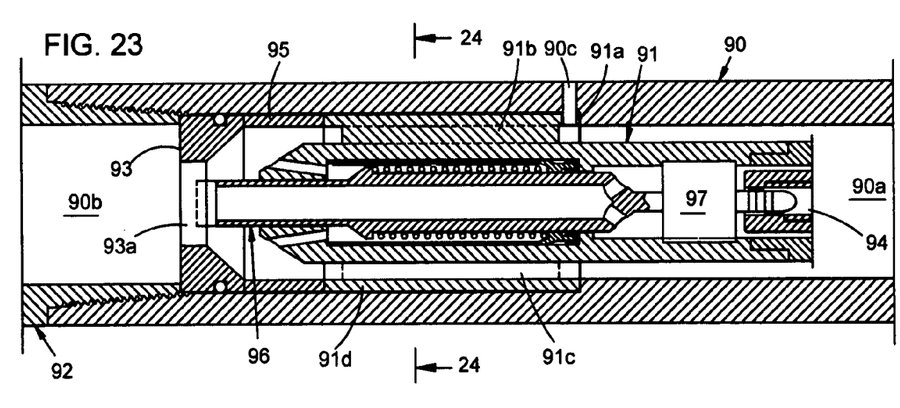
FIG. 23 is a side view, mostly cut away, showing an optional pulser mounting system.

FIG. 23 shows the pulser mounting option first used for pulsers used as turbodrill tachometer signal generators. The mud flow was then in the left-to-right direction, and a cam operated servo valve was a necessity to feed turbodrill turn information into the pulser. It was inexpensive and performed well.

The compression of the tool joint pin 92 against the orifice unit 93, sleeve 95 and the housing sleeve 91*d* loads the assembly against bore facing 91*a* with needed thrust to prevent drilling shock from loosening the pulser mounting. The pulser of FIG. 3 is shown secured by this system. This version is shown with a poppet control rod rather than a tubular upward extension. All poppet position controls and other features are symbolically shown as unit 97. The unit 94 is symbolic of connection to the MWD instrument. Unit 97 may be of an electric nature or an equivalent hydraulic connection as required by the poppet position controller.

Structurally, the serial drill string element 90 carries the pulser 91 in bore 90*a*. Pin 90*c*, in notch 91*a*, assures rotational relationship of the pulser and the instrument with a scribe line (not shown) on the drill string. Poppet 96 is positioned to cooperate with the orifice 93*a* to produce a servo valve.

Webs 91*b* allow major mud flow along channels 91*c* to bore 90*b*.

Figure 24:
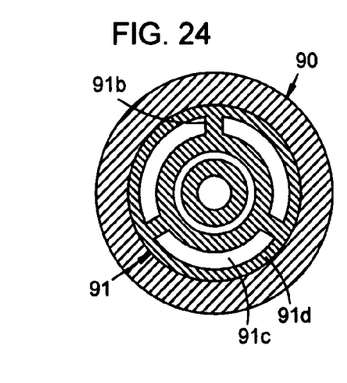
FIG. 24 is a section taken along line 24—24.

FIG. 24 is a section showing mounting webs 91*b*, the mud flow channel 91*c* inside the housing sleeve 91*d*, which is part of the housing 91.

Figure 25:
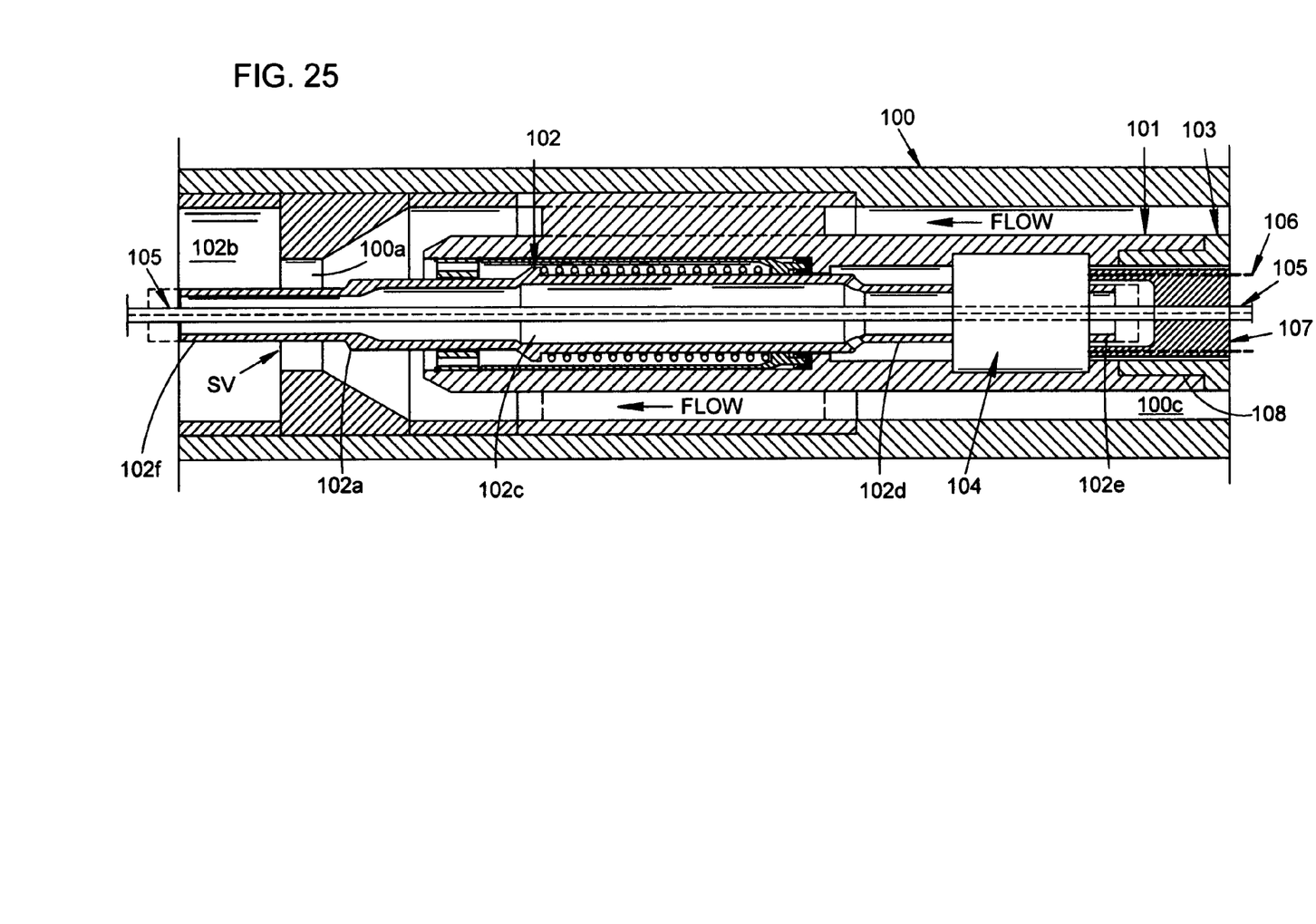
FIG. 25. Is a side view of an alternate form of the pulser.

FIG. 25 emphasizes the usefulness of the tubular poppet 102 in permitting the passage of the conductor 105 from apparatus above the pulser (not shown) to apparatus (not shown) below the pulser. This feature enables the placement of sensors and the like near the drill bit. This enables the use of drill string kick subs and the like, now in the art, to function without the limitation of the usual long MWD related housings being situated within the drill string deflecting apparatus. The package 104 represents any of the poppet control related apparatus disclosed herein.

Functionally, this is the pulser of FIG. 3, mounted in drill string serial element 100 according to the mounting system of FIG. 23, but any of the disclosed poppet systems can be used. That is anticipated by and is within the scope of the claims.

Structurally, optional mounting of FIG. 23 is used. Poppet 102 has extension 102*f* extending to protect the conductor 105 from the high velocity fluid passing through the orifice 100*a* into bore 102*b*. The enlargement 102*a* performs the signal valve SV flow restricting function. Bore 102*c* provides passage for the conductor. Extensions 102*d* and 102*e* function as the poppet control rod and can pass through such features as the acceleration compensators disclosed herein.

The upwardly extending portion 103 of the housing 101 may be attached by connector 108. Connector 108 may be a slip fit for attachment after the pulser is down hole, or a treaded connector, or the like. conductors such as 106, shown as imbedded in carrier 107 are symbolic and will conform to the requirements of the enclosure 104.

Conductor 105 may be a torque rod to convey azimuthal control to apparatus carried by the drill string, an electric conductor, an hydraulic conductor, or a combination of those natures.

This disclosure demonstrates an ability to utilize tubular poppets in all configurations shown, and demonstrates the ability to control and manipulate such poppets. Most electric energy generators can function with hollow shafts, and those in the art can provide annular mud motors and directly connected alternators to operate in the space available.

From the foregoing, it will be seen that this invention is one well adapted to attain all of the ends and objects hereinabove set forth, together with other advantages which are obvious and which are inherent to the pulser system.

It will be understood that certain features and sub-combinations are of utility and may be employed without reference to other features and sub-combinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

The invention claimed is:

1. A pulser apparatus for use in wells, in a pipe string, to generate brief pressure changes in a mud stream flowing down the pipe string bore, in response to a down hole instrument, to convey information from the lower end of the pipe string to the surface, the apparatus comprising:
   a) a housing arranged for selected location in the bore of said pipe string;
   b) an orifice, having an upstream side and a downstream side, situated in the bore of said pipe string through which at least part of said mud stream flows;
   c) a poppet situated in said housing and arranged to cooperate with said orifice to comprise a signal valve to vary the resistance to the flow of said mud stream to vary the pressure drop across said orifice;
   d) a first piston surface on said poppet and an opposed second piston surface on said poppet;
   e) a first fluid pressure conducting channel arranged to conduct fluid pressure from the downstream side, as defined herein, of said orifice to said first piston surface;
   f) a second fluid pressure conducting channel arranged to conduct fluid pressure from the upstream side of said orifice to said second piston surface;
   g) a poppet position controller, intermittently secured to said poppet, responsive to said instrument, to determine at least one controlled position of said poppet relative to said orifice;
   h) a spring arranged to urge said poppet toward said orifice;
   i) said piston surfaces and said spring so arranged that said poppet is urged toward said orifice when said pressure drop across said orifice is less than a preselected amount and is urged away from said orifice when said pressure drop across said orifice is more than said preselected amount.

2. The pulser apparatus of claim 1 wherein said first fluid channel extends through a generally central bore of said poppet.

3. The pulser apparatus of claim 1 wherein said pulser, if un-restrained, will oscillate between axial travel limits.

4. The pulser apparatus of claim 1 wherein said position controller comprises a permanent magnet, an electric coil capable of neutralizing the permanent magnet in response to electric energy from said instrument, and a plate attached to said poppet for attraction to said magnet.

5. The pulser apparatus of claim 4 wherein said permanent magnet is arranged to move a limited amount by said attraction to said plate, and a latch to releasably secure said poppet to said housing in response to said movement of said magnet.

6. The pulser apparatus of claim 1 wherein said poppet is attached to an acceleration compensator that responds to acceleration of said housing to apply such forces to said poppet that it will be accelerated in about the same direction and with about the same magnitude as said housing.

7. The pulser apparatus of claim 1 wherein said poppet is fitted with a pulse amplitude regulator which, in response to said pulse amplitude, limits said pulse amplitude by shortening said poppet.

8. The pulser apparatus of claim 7 wherein said pulse amplitude regulator maintains a preselected minimum pressure differential across said orifice by lengthening said poppet in response to said pressure differential across said orifice.

9. The pulser apparatus of claim 2 wherein said housing has a mud powered motor with an inlet to receive mud from the mud stream outside the housing and a discharge channel to pass mud to said downstream side of said orifice by way of said bore in said poppet, said mud motor having an output shaft to provide power to apparatus in said housing.

10. The pulser apparatus of claim 9 wherein an electric energy generator is arranged to be driven by said mud motor, said electric energy generator arranged to deliver electric power to said apparatus.

11. The pulser apparatus of claim 1 wherein said housing is, functionally, composed of surfaces in the material making up the serial drill string element carrying out the MWD function.

12. The pulser apparatus of claim 1 wherein said poppet bore is used as a passage for at least one communication conductor to pass from upstream of the pulser to drill string bore areas down stream of the pulser.

13. The pulser apparatus of claim 12 wherein said communication conductor includes a torque tube to transmit rotational information form upstream of said pulser to a location downstream of said pulser.

14. The pulser apparatus of claim 12 wherein said communication conductor carries at least one electrical conductor from upstream of said pulser to a location down stream of said pulser.

15. A pulser for use in Measurement While Drilling (MWD) in wells, situated down hole on drill strings, to generate signal pressure pulses, in response to a sensing and control instrument, in the mud stream moving down the bore of the drill string, the pulser comprising: a signal valve, comprising an orifice and a cooperating poppet with a generally cental bore extending axially therethrough, a piston on the poppet with opposing faces exposed to mud pressure communicated from the opposite sides of the orifice, arranged such that the pressure difference across said orifice tends to move said poppet away from said orifice, a spring arranged to urge said poppet toward said orifice, and a poppet position controller intermittently secured to said poppet, responsive to said instrument, to restrain the poppet in at least one position relative to said orifice, and a generally central bore extending through the poppet and said poppet position controller, said generally central bore capable of accepting a communication conductor extending axially through said pulser during pulse generating processes.

16. A pulser apparatus for use in wells, in a pipe string, to generate brief pressure changes in a mud stream flowing down the pipe string bore, in response to a down hole instrument, to convey information from the lower end of the pipe string to the surface, the apparatus comprising:
   a) a housing arranged for selected location in a muleshoe located in the bore of said pipe string;
   b) an orifice, having an upstream side and a downstream side, situated in the bore of said pipe string through which at least part of said mud stream flows;
   c) a poppet situated in said housing and arranged to cooperate with said orifice to comprise a signal valve to vary the resistance to the flow of said mud stream to vary the pressure drop across said orifice;
   d) a first piston surface on said poppet and an opposed second piston surface on said poppet;
   e) a first fluid pressure conducting channel arranged to conduct fluid pressure from the downstream side of said orifice to said first piston surface;
   f) a second fluid pressure conducting channel arranged to conduct fluid pressure from the upstream side of said orifice to said second piston surface;
   g) a poppet position controller, intermittently secured to said poppet, responsive to said instrument, to determine at least one controlled position of said poppet relative to said orifice;
   h) a spring arranged to urge said poppet toward said orifice;
   i) said piston surfaces and said spring so arranged that said poppet is urged toward said orifice when said pressure drop across said orifice is less than a preselected amount and is urged away from said orifice when said pressure drop across said orifice is more than said preselected amount
   j) said orifice situated to pass a mud stream through the wall of said drill string to generate a negative pressure pulse in response to movement of said poppet.

* * * * *